United States Patent [19]

Tradowsky

[11] 3,997,981
[45] Dec. 21, 1976

[54] REMOTE CONTROL RESPONSE SYSTEM FOR CLASSROOM USE

[76] Inventor: Michael Tradowsky, 10370 Blair Lane, Kirtland, Ohio 44194

[22] Filed: June 16, 1975

[21] Appl. No.: 587,262

[52] U.S. Cl. .................. 35/48 R; 35/9 R; 34/48
[51] Int. Cl.² .......................... G09B 7/02
[58] Field of Search ........... 35/8 R, 9 R, 9 A, 9 B, 35/9 C, 35 C, 48 R, 48 A, 48 B

[56] References Cited
UNITED STATES PATENTS

| | | | |
|---|---|---|---|
| 2,970,387 | 2/1961 | Dean | 35/9 A |
| 3,175,303 | 3/1965 | Kirkconnell | 35/48 R X |
| 3,283,416 | 11/1966 | Taylor et al. | 35/9 R |
| 3,416,242 | 12/1968 | Nisbet | 35/48 R |
| 3,416,243 | 12/1968 | Greenberg et al. | 35/48 R |

Primary Examiner—Anton O. Oechsle
Assistant Examiner—Vance Y. Hum
Attorney, Agent, or Firm—Donnelly, Maky, Renner & Otto

[57] ABSTRACT

A remote control response system for facilitating the testing of medical or dental students, for example, in decision-making process in the diagnosis and treatment planning of patients depicted by audio-visual materials such as motion pictures or video tapes characterized in that each student has a portable unit with an indexable answer sheet, and the instructor has a transmitter operative to simultaneously index the respective answer sheets in the students' units after each question whereby the correct answer may be given and discussed before proceeding via the audio visual materials with the next question concerning diagnosis and treatment planning of said patient.

2 Claims, 3 Drawing Figures

REMOTE CONTROL RESPONSE SYSTEM FOR CLASSROOM USE

BACKGROUND OF THE INVENTION

In testing situations of medical or dental students for example it is difficult for an instructor to let the student know the correct answer to a question immediately after he has made a response thereto and before going on to the next question. If the responses are made on a sheet of paper the students have the possibility of correcting wrong responses or delaying responses until the correct answer is known. Accordingly, it is common practice to withhold the answers until the student sheets are turned in. However, the ability of immediate feedback of correct answers during the test is indispensable in some cases, namely, when the student's decision-making ability should be evaluated and when one decision influences the next decision. Accordingly, any system which intends to test the ability for this type of decision-making in sequence must fulfill two objectives: (1) it must reveal only as much information at a time as is needed to make the next decision; and (2) the students' decisions must be recorded immediately and unalterably.

There are at present two systems in use which fulfill the foregoing objective. One of these is the computerized classroom wherein each student's desk is equipped with multiple choice pushbuttons which are wired to a computer. A video tape of the patient could be presented and stopped whenever the student has to make a decision concerning diagnosis and treatment planning. When all students have punched their responses into the computer, the video tape is restarted for the next section until the next decision is to be made. A disadvantage of this system is the high cost of equipment and installation thereof and furthermore it can only be used in the particular classroom which is equipped with such special desks. The other system is the written simulation system in which the testing technique employs invisible print which appears when the student applies a special marking pen. This type of test does conceal parts of the information until certain decisions have been made by the student and scoring is accomplished by counting the number of right and wrong choices of responses which have been made visible by the student. The disadvantage of this written simulation system is the fact that the student makes his decision on the basis of a written description of the patient rather than direct observation of an act or audio visual material such as movie film or video tape.

SUMMARY OF THE INVENTION

In contradistinction to known testing systems regarding for example diagnosis and treatment planning for physicians and dentists, the present system lends itself for use with audio visual materials, it can be used in any classroom by any number of students, and it is inexpensive in that it utilizes electromagnetic control comprising a transmitter which is controlled by the instructor and the students' response units which receive impulses from the transmitter to advance the answer sheets to a position where they cannot be altered whereby discussion of each correct answer may be had immediately after each question has been answered by the students.

DETAILED DESCRIPTION OF A PREFERRED EMBODIMENT

Figure 1:
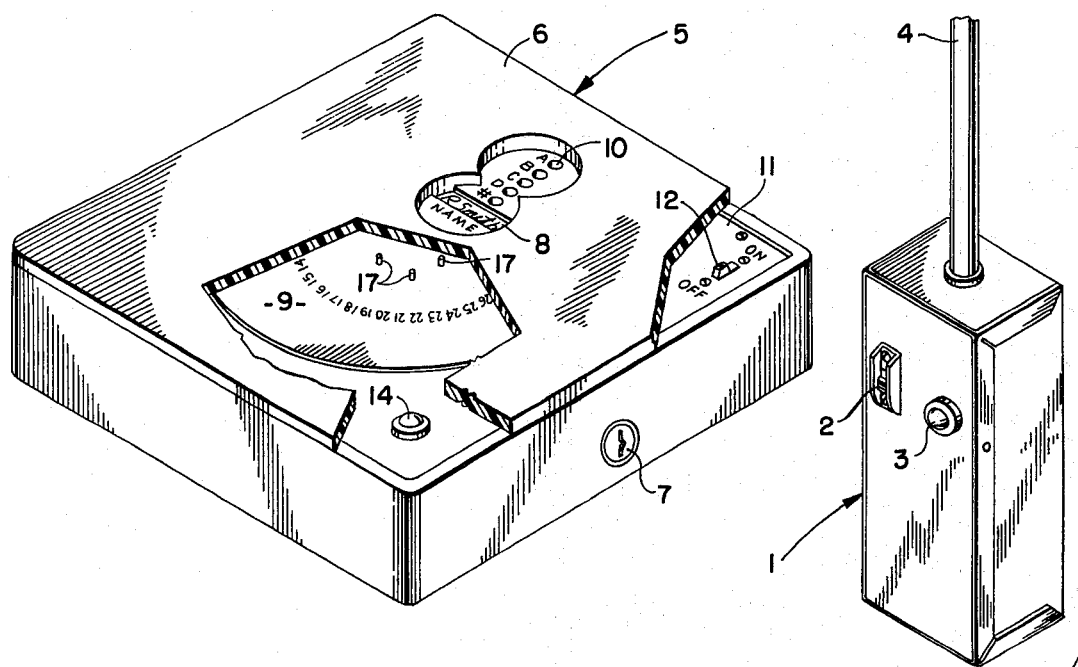
FIG. 1 is a perspective view of a student's response box with portions of the locked cover broken away to show the indexable answer sheet, a pushbutton control for manual indexing of the answer sheet, and an on-off switch, said FIG. 1 also showing in perspective the instructor's transmitter by which the student's response box is remotely actuated to index the answer sheet.
Figure 2:
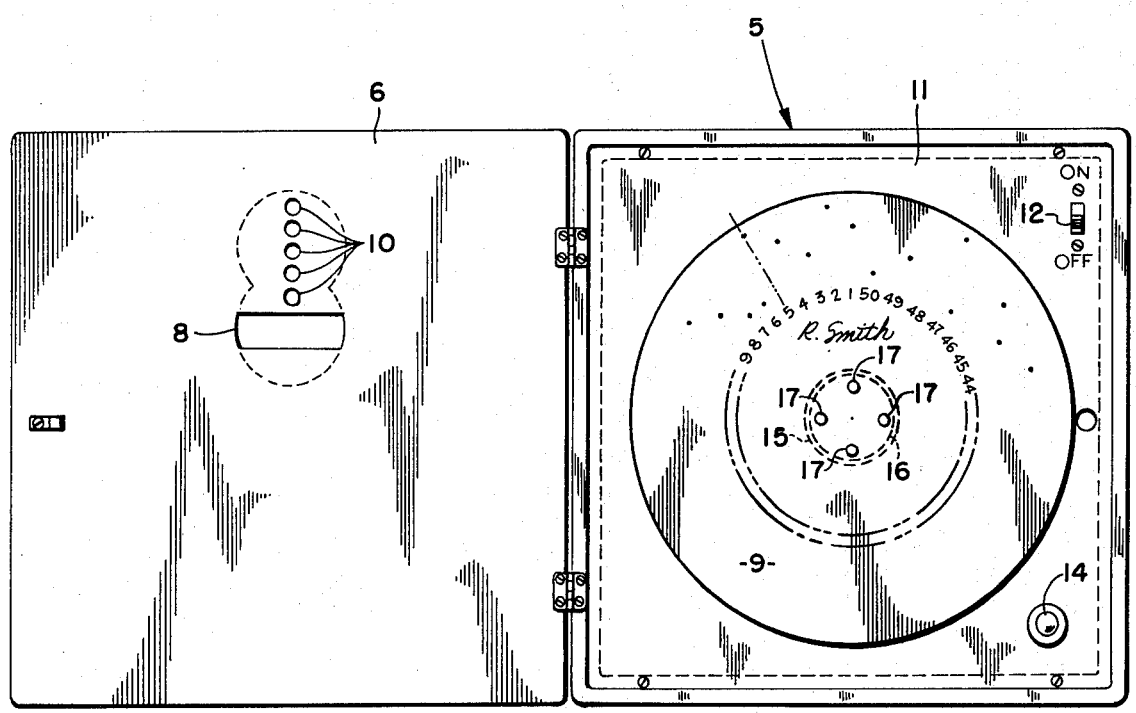
FIG. 2 is a plan view of the student's response box with the cover unlocked and swung to an open position.

As shown in FIG. 1, the instructor's transmitter 1 may be of conventional construction including an on-off switch 2 and a pushbutton switch 3 which, when depressed, transmits a signal from the antenna 4 for receipt by the receiver in each student's response box 5 in a manner hereinafter explained.

The student's response box 5 has a hinged cover 6 which is adapted to be locked in the position shown in FIG. 1 as by a key-operated lock 7, said cover 6 having an opening 8 therethrough so that the student may write his name on the answer sheet 9 beneath the cover 6 and having a series of openings 10 of which one of them exposes the successive question numbers printed on the answer sheet 9 and of which the remaining openings 10 labeled A, B, C, and D are for recording a multiple choice answer on the answer sheet 9 by means of a pen or pencil or the like. Another alternative for recording an answer through one of the openings 10 which are labeled A, B, C, or D would include a stylus for forming dimples in the sheet 9 which may be read by suitable equipment.

The top of the box 5 beneath cover 6 is closed by a plate 11 which carries an on-off switch 12 and a pushbutton switch 14, and has a central opening 15 in which the drive disc 16 is indexable. Said drive disc 16 may have drive pins 17 projecting upwardly therefrom to extend through corresponding openings in the answer sheet 9. When an answer sheet 9 is placed on the pins 17, the pushbutton 14 may be actuated to position the number 1 in register with the opening 10 labeled " # ". The cover 6 may then be locked in place ready for the commencement of the test.

Figure 3:
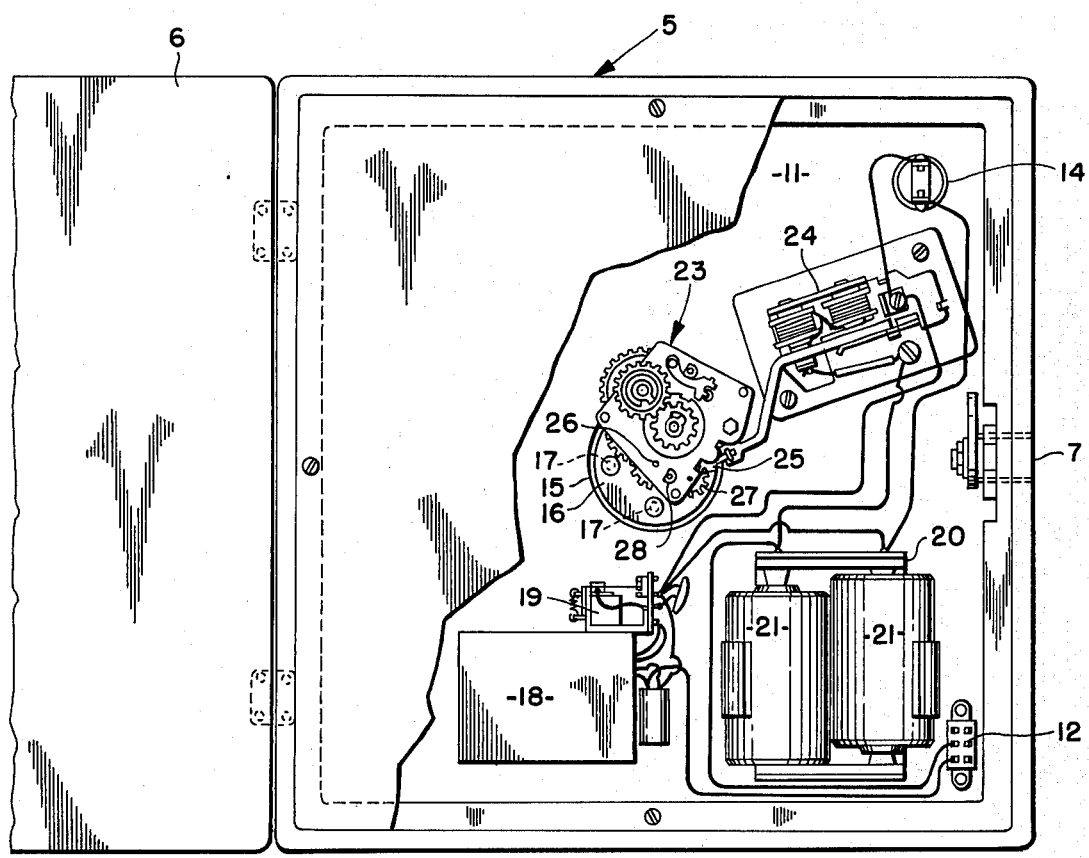
FIG. 3 is a bottom plan view with the bottom plate partly broken away to show the indexing mechanism and a battery-powered receiver for receiving indexing impulses from the instructor's transmitter.

Referring now to FIG. 3, the underside of the plate 10 has mounted thereon a receiver 18 having a relay 19, a battery holder 20 for batteries 21, an indexing mechanism 23, and an electromagnet 24. The indexing mechanism 23 may comprise a springactuated motor such as that used in a domestic-type timer in which a double arm escapement 25 is operated upon energization of the electromagnet 24 either by the receiver 18 or by the pushbutton switch 14 as explained above. Such timer motor 23 has the shaft 26 of one of its gears coupled to the drive disc 16 so that each time that the electromagnet 24 is energized the escapement wheel 27 is indexed one tooth thus to index the drive disc 16 and the answer sheet 9 thereon.

The batteries 21 are connected as shown to supply current to the electromagnet 24 whenever the pushbutton 14 is actuated while cover 6 is open. When the switch 12 is "on" the batteries 21 energize the receiver 18 so that when it receives a signal from the transmitter 1, the relay 19 is actuated to, in turn, energize the electromagnet 24.

The bottom of the box 5 will be provided with an opening (not shown) registering with the spring-winding shaft 28 for periodic winding of the spring with a suitable key and, of course, the intervals between winding will be relatively infrequent especially if the answer sheet drive shaft 26 is coupled to the gear which corresponds to the one second interval whereby in the conventional clockwork for a 60 minute timer the winding of the spring to the 60 minute time would permit use of a student's answer unit for sixty tests each having sixty questions. However, to prevent running out of the spring-winding it is generally the practice to wind up the spring motor 23 before each test.

Although the present invention has been developed especially for the training of medical and dental students in connection with diagnostic and treatment planning decision-making testing, the remote control response system herein has utility in connection with training or testing of law students, engineering students, etc.

When the test has been concluded, the students' response units 5 are unlocked for turning the switch 12 to "off" position and to remove the completed answer sheet 9 for grading by appropriate means which do not form any part of the present invention.

Because the correct answer is given immediately after each question, each student may grade himself as the test progresses whereby at the end of the test each student will known what his score was without waiting for scoring of the completed answer sheet 9. As already mentioned, the giving of the correct answer after each question steers the students in the proper direction for answering succeeding questions whereas in normal testing procedures a wrong answer to one question will lead to wrong answers on succeeding questions. With the present system each step in diagnosis and treatment with the correct answer steers the students along the correct path of diagnosis and treatment planning.

In conclusion, it can be seen that the present response system is inexpensive and can be used anywhere and there is virtually no maintenance except for infrequent replacement of batteries in view of the low current consumption of the transistorized receiver 18 and the pulsing operation of the relay 19 and electromagnet 24. To conserve battery life, the switch 12 should be in the off position except during the actual tests. Furthermore, the clockwork indexing mechanism 23 in inexpensive in initial cost and consumes no electrical energy except that required to operate the escapement mechanism 25 which allows one-tooth indexing of the spring actuated escapement wheel 27.

The embodiments of the invention in which an exclusive property or privilege is claimed are defined as follows:

1. A remote control response system for student testing and the like in conjunction with visual-audio materials and an instructor-controlled transmitter means comprising a unit for each student having an answer sheet therein successively indexed for recording of answers to questions on successive exposed areas of said sheet; drive means in said unit operative to so index said answer sheet; said drive means including a signal receiver means operative by a signal emitted from said instructor-controlled transmitter means to effect operation of said drive means to successively index said answer sheet each time that said receiver means receives a signal from said transmitter means; said drive means comprising a spring motor in each unit having an escapement mechanism actuated by said receiver means.

2. A remote control response system for student testing and the like in conjunction with visual-audio materials and an instructor-controlled transmitter means comprising a unit for each student having an answer sheet therein successively indexed for recording of answers to questions on successive exposed areas of said sheet; drive means in said unit operative to so index said answer sheet; said drive means including a signal receiver means operative by a signal emitted from said instructor-controlled transmitter means to effect operation of said drive means to successively index said answer sheet each time that said receiver means receives a signal from said transmitter means; a cover on each unit which overlies said answer sheet except at a restricted open area through which answers are recorded at each indexed position with answers being indexed out of register with such area to prevent alteration thereof; said unit having lock means thereon to lock said cover in place; and said unit having manual switch means accessible only when said cover is unlocked whereby said drive means and answer sheet may be indexed independently of signals emitted by said transmitter means.

* * * * *